(12) United States Patent
Myers et al.

(10) Patent No.: US 10,458,318 B2
(45) Date of Patent: Oct. 29, 2019

(54) METHOD FOR ADJUSTING EXHAUST GAS TEMPERATURE AND TURBINE WITH BYPASS ARRANGEMENT

(71) Applicant: MACK TRUCKS, INC., Greensboro, NC (US)

(72) Inventors: Adam Myers, Hagerstown, MD (US); John Gibble, Greencastle, PA (US)

(73) Assignee: VOLVO LASTVAGNAR AB, Göteborg (SE)

( * ) Notice: Subject to any disclaimer, the term of this patent is extended or adjusted under 35 U.S.C. 154(b) by 925 days.

(21) Appl. No.: 14/442,070

(22) PCT Filed: Dec. 5, 2012

(86) PCT No.: PCT/US2012/067875
§ 371 (c)(1),
(2) Date: May 11, 2015

(87) PCT Pub. No.: WO2014/088565
PCT Pub. Date: Jun. 12, 2014

(65) Prior Publication Data
US 2015/0300243 A1    Oct. 22, 2015

(51) Int. Cl.
*F02B 37/18* (2006.01)
*F01D 17/10* (2006.01)
(Continued)

(52) U.S. Cl.
CPC .................................. *F02B 37/183* (2013.01)

(58) Field of Classification Search
CPC ........ F02B 37/22; F02B 37/24; F02B 37/183; F02B 37/186; F01D 17/105; F01D 17/12; F01D 17/14; F01D 17/141; F01D 17/143; F01D 17/145; F01D 17/146; F01D 17/148; F01D 17/16; F01D 17/162; F01D 17/165;
(Continued)

(56) References Cited

U.S. PATENT DOCUMENTS 3,137,477 A * 6/1964 Kofink .................... F01D 9/045
                                                                    415/166
4,389,845 A 6/1983 Koike
(Continued)

FOREIGN PATENT DOCUMENTS

DE 102014018069 A1 * 7/2015 ............ F02B 37/025
JP H03092503 U 9/1991
(Continued)

OTHER PUBLICATIONS

English Translation of JPH11311124.*
(Continued)

*Primary Examiner* — Jason D Shanske
*Assistant Examiner* — Jessica L Kebea
(74) *Attorney, Agent, or Firm* — WRB-IP LLP

(57) ABSTRACT

A turbocharger includes a turbine comprising a scroll passage including at least first and second portions, a gas outlet extending axially from the scroll passage, a turbine wheel including one or more blades disposed in the gas outlet, and structure for establishing a bypass flow between the first and second portions of the scroll passage or for altering gas flow through the turbine. A method for adjusting exhaust gas temperature is also provided.

14 Claims, 7 Drawing Sheets

(51) Int. Cl.
*F01D 17/16* (2006.01)
*F01D 9/02* (2006.01)
*F01N 5/04* (2006.01)
*F02B 37/22* (2006.01)
*F02C 6/12* (2006.01)

(58) Field of Classification Search
CPC ........ F01D 17/167; F01D 17/18; F01D 9/041; F01D 9/042; Y02T 10/144
See application file for complete search history.

(56) References Cited

U.S. PATENT DOCUMENTS

| | | | |
|---|---|---|---|
| 4,502,282 A * | 3/1985 | Kanesaka | F01D 17/146 60/602 |
| 4,586,878 A | 5/1986 | Witchger | |
| 5,092,126 A * | 3/1992 | Yano | F01D 17/146 415/164 |
| 6,073,447 A * | 6/2000 | Kawakami | F01D 9/026 60/602 |
| 6,751,956 B2 | 6/2004 | Mayer et al. | |
| 6,941,755 B2 | 9/2005 | Bucknell et al. | |
| 7,117,596 B2 | 10/2006 | Ohishi | |
| 7,870,730 B2 | 1/2011 | Dronzkowski et al. | |
| 7,918,023 B2 | 4/2011 | Sausse et al. | |
| 7,930,888 B2 | 4/2011 | Parker | |
| 7,946,116 B2 | 5/2011 | Sausse et al. | |
| 7,980,816 B2 | 7/2011 | Severin et al. | |
| 8,020,381 B2 | 9/2011 | Zurawski et al. | |
| 8,021,107 B2 | 9/2011 | Espasa et al. | |
| 8,033,109 B2 | 10/2011 | Sausse et al. | |
| 8,056,336 B2 | 11/2011 | Arnold et al. | |
| 2006/0230759 A1 * | 10/2006 | Semrau | F01D 17/141 60/602 |
| 2009/0142186 A1 | 6/2009 | Parker | |
| 2011/0067397 A1 | 3/2011 | Hirth et al. | |
| 2011/0099998 A1 | 5/2011 | Serres et al. | |
| 2011/0268559 A1 | 11/2011 | Lombard et al. | |
| 2016/0230585 A1 * | 8/2016 | Arnold | F01D 5/043 |

FOREIGN PATENT DOCUMENTS

| | | | | |
|---|---|---|---|---|
| JP | H07279619 A | | 10/1995 | |
| JP | 11311124 A | * | 11/1999 | |
| JP | H11311124 A | | 11/1999 | |
| JP | 2007309140 A | * | 11/2007 | |
| KR | 101046206 B1 | * | 7/2011 | |
| WO | WO 2012170754 A1 | * | 12/2012 | ............. F01D 9/026 |
| WO | WO 2015080920 A1 | * | 6/2015 | ........... F01D 17/105 |

OTHER PUBLICATIONS

KR-101046206-B1 to Hwang (English Translation Pub Jul. 2011) (Year: 2011).*
Office Action dated Mar. 9, 2016 of corresponding China application No. 201280077514.6 translated.
Office Action dated Jul. 26, 2016 of corresponding Japan application No. 2015-546429 translated.
Extended European Search Report dated Jul. 29, 2016 for corresponding European application No. 12889639.6.
International Search Report (dated Feb. 8, 2013) for corresponding International App. PCT/US2012/067875.
International Preliminary Report on Patentability (dated Jun. 9, 2015) for corresponding International App. PCT/US2012/067875.

* cited by examiner

METHOD FOR ADJUSTING EXHAUST GAS TEMPERATURE AND TURBINE WITH BYPASS ARRANGEMENT

BACKGROUND AND SUMMARY

The present application relates, according to an aspect thereof, generally to methods and apparatus for adjusting engine exhaust gas temperature in an engine including a turbine in the exhaust stream.

Modern diesel engines typically include exhaust aftertreatment systems (EATS) with one or more components such as diesel particulate filters (DPFs), diesel oxidation catalysts (DOCs), and selective catalytic reduction catalysts (SCRs). Most of the EATS components are intended to operate within particular temperature ranges. During operation at start-up or at low loads, it may be difficult to reach or maintain the temperatures necessary to activate catalysts on equipment such as DPFs, DOCs, and SCRs. Additionally, it is occasionally necessary to increase exhaust gas temperatures to well above normal operating temperatures to regenerate components such as DPFs.

One way of raising exhaust gas temperature has been to use a variable geometry turbocharger (VGT) with a turbine downstream of the engine. The VGT can be adjusted to reduce the efficiency of the turbocharger, which can result in an increase in engine exhaust temperature. VGTs, however, tend to be expensive and involve numerous moving parts that can be subject to failure.

Another technique for raising exhaust gas temperature involves the use of a discharge recirculation valve that decreases compressor efficiency without increasing preturbine pressures. Still further techniques include use of intake and exhaust throttles, tailpipe hydrocarbon injection, and charge air cooler (CAC) bypass valves.

It is desirable to provide a simple, inexpensive apparatus and method for adjusting exhaust gas temperature.

According to an aspect of the present invention, a turbocharger comprises a turbine comprising a scroll passage comprising at least first and second portions, a gas outlet extending axially from the scroll passage, a turbine wheel comprising one or more blades disposed in the gas outlet, and means for establishing a bypass flow between the first and second portions of the scroll passage.

According to another aspect of the present invention, a turbocharger comprises a turbine comprising a scroll passage, a gas outlet extending axially from the scroll passage, a turbine wheel comprising one or more blades disposed in the gas outlet, a nozzle ring arranged between the scroll passage and the gas outlet, the nozzle ring comprising a plurality of vanes adapted to direct a flow of gas from the scroll passage against the one or more blades of the turbine wheel in the gas outlet, and means for moving the nozzle ring relative to the scroll passage to alter the gas flow through the nozzle ring from the scroll passage toward the one or more blades of the turbine wheel.

According to another aspect of the present invention, a method for adjusting exhaust gas temperature in an engine comprising a turbine arranged to receive engine exhaust comprises causing engine exhaust gas to flow through a scroll passage of the turbine toward a gas outlet of the turbine, the scroll passage comprising at least first and second portions, and establishing a bypass flow between the first and second portions of the scroll passage.

According to yet another aspect of the present invention, a method for adjusting exhaust gas temperature in an engine comprising a turbine arranged to receive engine exhaust comprises causing engine exhaust gas to flow through a scroll passage of the turbine toward a gas outlet of the turbine, the scroll passage comprising at least first and second portions, directing the exhaust gas against one or more blades of a turbine wheel in the gas outlet of the turbine with a nozzle ring comprising a plurality of vanes arranged at a first orientation relative to the scroll passage, and moving the nozzle ring from a first position relative to the scroll passage in which the plurality of vanes on the nozzle ring direct gas against the one or more blades of the turbine wheel to a second position relative to the scroll passage in which gas flow from the scroll passage through the plurality of vanes into the gas outlet is altered relative to gas flow in the first position.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Gas flow through scroll passages in a turbocharger turbine connected to the exhaust of a multi-cylinder engine is not ordinarily at a constant pressure over the length of the scroll passage. In single scroll turbines, pressure differences will be present between different locations of the scroll due to factors such as opening and closing of piston valves and pressure losses as exhaust flows around the scroll. In addition, in twin scroll turbines, pressure differences will be present between the scrolls, also usually due factors such as to opening and closing of piston valves, some of which pistons exhaust to one scroll and some to the other, and due to pressure losses as exhaust flows around the scrolls, one of which is ordinarily longer than the other.

Figure 1:
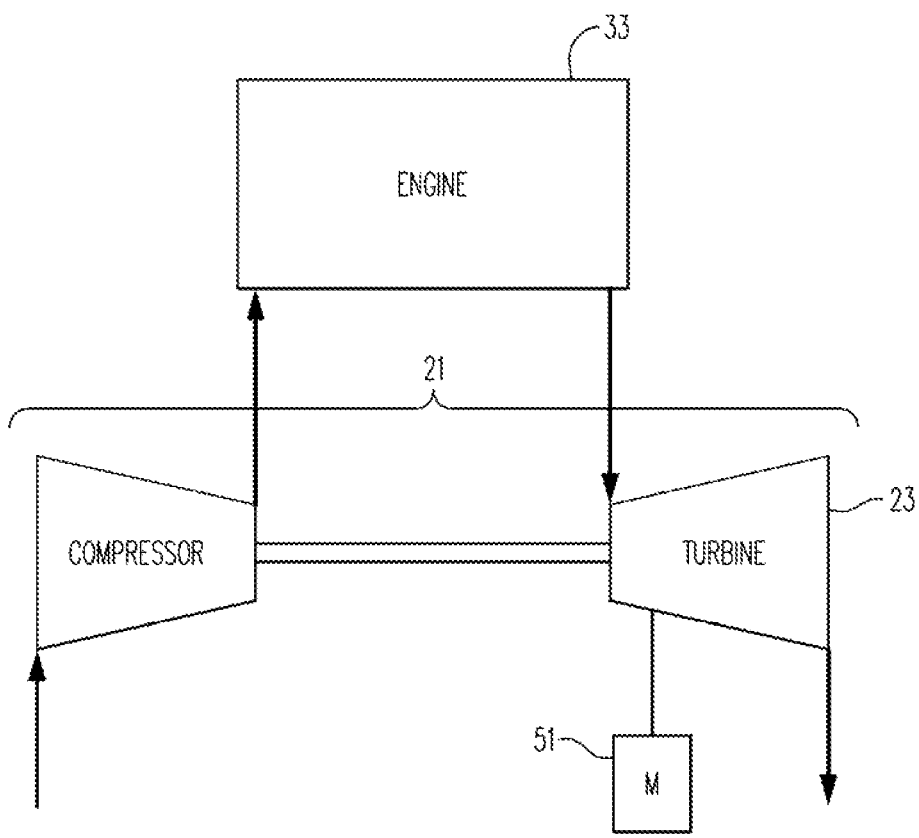
FIG. 1 is a schematic view of an engine with a turbocharger and turbine.
Figure 2A:
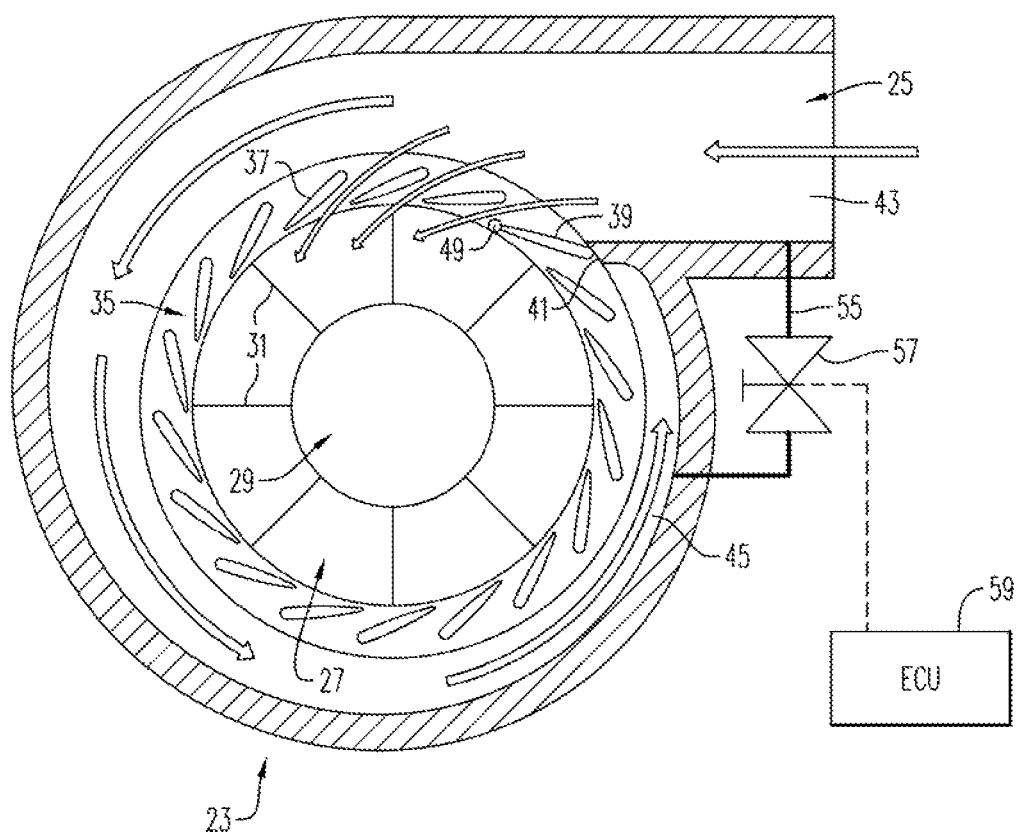
FIG. 2A is a partially cross-sectional view of a portion of a turbine according to an aspect of the present invention.

A turbocharger 21 according to an aspect of the present invention is shown in FIG. 1 and includes a turbine 23. The turbocharger 21 is preferably a fixed geometry turbocharger. An embodiment of the turbine 23 comprises a scroll passage 25 such as is seen in FIG. 2A comprising at least first and second portions. The first and second portions of the scroll passage 25 may take various forms. The turbine 23 comprises a gas outlet 27 extending axially from the scroll passage 25 and a turbine wheel 29 comprising one or more blades 31 disposed in the gas outlet.

One or more of several suitable structures or means can be provided for establishing a bypass flow between the first and second portions of the scroll passage 25 such that some or all of the gas flowing through the scroll passage toward the gas outlet 23 is permitted to flow to one or the other of the first and second portions before it reaches the gas outlet. The structure for establishing the bypass flow can alter or disrupt gas flow and/or lower pressure of the gas in the scroll passage when the bypass flow is established, so as to tend to reduce turbine efficiency. Reduced turbine efficiency can, in turn, result in increased temperature of gas exiting the engine 33 to which the turbocharger 21 is attached. The increased engine exhaust temperature can be used to activate catalysts in exhaust aftertreatment system equipment such as a diesel particulate filter (DPF), a diesel oxidation catalyst (DOC), and/or a selective catalytic reduction catalyst (SCR). It can also facilitate regeneration of the DPF by creating or helping to create sufficiently high temperatures for O2 based regeneration or for NO2 based regeneration.

Figure 2B:
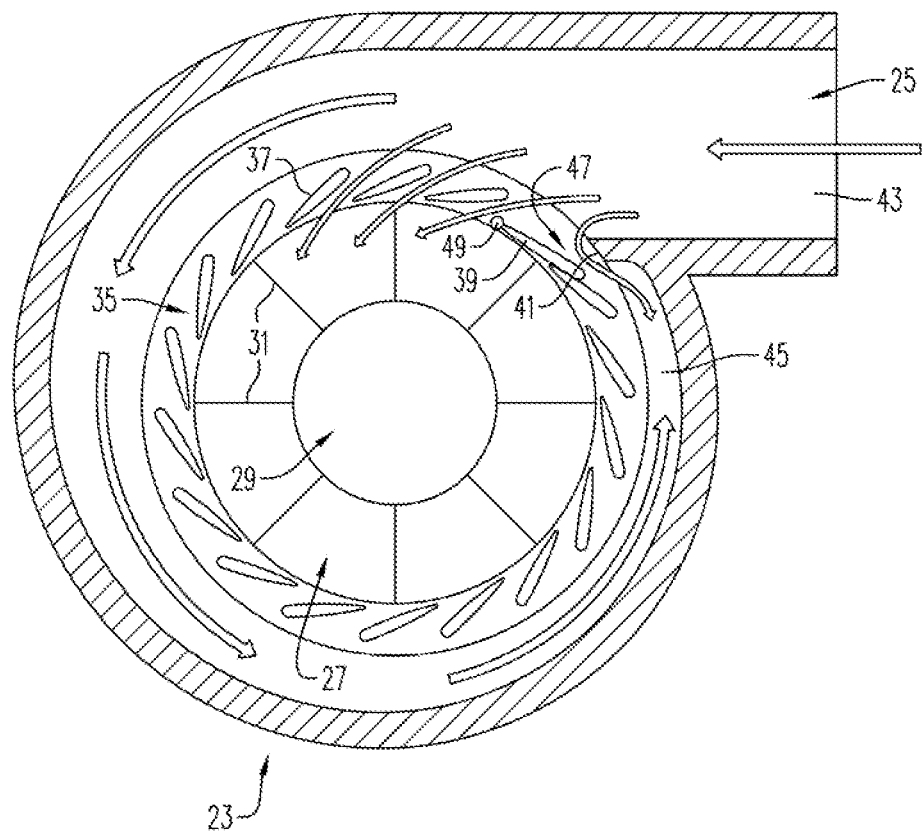
FIG. 2B is a partially cross-sectional view of the portion of the turbine of FIG. 2A showing a sealing vane moved relative to a nozzle ring of the turbine.

FIG. 2A shows one possible structure for establishing the bypass flow that can be used by itself or in conjunction with the structures shown in FIGS. 2B and/or 2C. Specifically, a conduit 55 can be connected between a first portion 43 of the scroll passage 25 near a beginning of the scroll passage, i.e., an inlet region, from a second portion 45 of the scroll passage near the end of the scroll passage, i.e., an end region, and a controllable valve 57 can be provided in the conduit that opens to establish the bypass flow. The valve 57 can be controlled by a conventional ECU or other computing device 59, or by any other suitable means, including manual operation.

One of the possible structures for establishing the bypass flow is seen in FIG. 2B and comprises a nozzle ring 35 arranged between the scroll passage 25 and the gas outlet 27. The nozzle ring 35 comprises a plurality of vanes 37 adapted to direct a flow of gas from the scroll passage 25 against the one or more blades 31 of the turbine wheel 29 in the gas outlet 27. The nozzle ring 35 shown in FIGS. 2A and 2B comprises at least one sealing vane 39 that extends to an inner wall or tongue 41 of the gas outlet 27 and seals the first portion 43 of the scroll passage 25 from the second portion 45 of the scroll passage. In the embodiments shown in FIGS. 2A-2C, the first and second portions 43 and 45 of the scroll passage 25 take the form of different portions of the same scroll passage. One or more structures or means is provided for moving the sealing vane 39 relative to the scroll passage 25 to establish the bypass flow between the first and second portions 43 and 45 of the scroll passage. The sealing vane 39 is moved relative to the scroll passage 25 by moving the sealing vane relative to a stationary nozzle ring 35. As seen in FIG. 2B, this opens a bypass or passage 47 between a first and second portions 43 and 45 of the scroll passage 25. The ordinary flow pattern seen in FIG. 2A, usually a flow with minimal turbulence, through the scroll passage 25, the nozzle ring 35, and against the turbine blades 31 is disrupted by the opening of the bypass 47 as higher pressure flow from the first portion 43 of the scroll passage flows into the lower pressure region at the second portion 45 of the scroll passage. Consequently, turbine efficiency decreases.

The sealing vane 39 can be moved in any suitable manner, such as by being mounted on a pivotable rod 49 mounted in a wall of the turbine housing and is turned through a limited angle by a device 51 (shown schematically in FIG. 1) such as a solenoid or a motor. Ordinarily, the rod 49 will extend through a wall of the turbine housing and the rod and sealing vane 39 will be turned by a device 51 mounted outside of the turbine, although numerous arrangements can be contemplated for driving the rod and sealing vane, and including devices that would be partially or completely disposed inside the turbine housing, not necessarily from outside of the turbine.

Figure 2C:
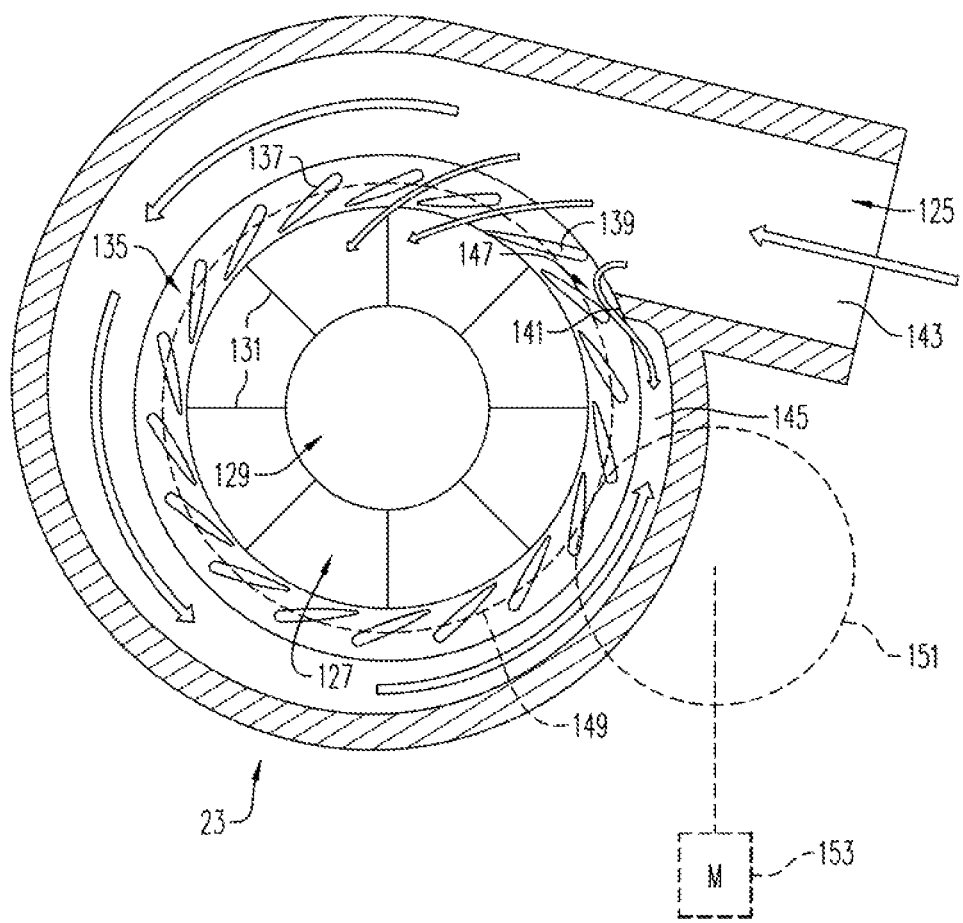
FIG. 2C is a partially cross-sectional view of a portion of a turbine according to another aspect of the present invention showing a nozzle ring moved relative to a scroll passage.

Another one of the possible structures for establishing the bypass flow is seen in the turbine 123 shown in FIG. 2C and comprises a nozzle ring 135 arranged between the scroll passage 125 and the gas outlet 127. The nozzle ring 135 comprises a plurality of vanes 137 adapted to direct a flow of gas from the scroll passage 125 against the one or more blades 131 of the turbine wheel 129 in the gas outlet 127. As with the nozzle ring 35 shown in FIGS. 2A and 2B, the nozzle ring 135 shown in FIG. 2C comprise at least one sealing vane 139 that extends to an inner wall or tongue 141 of the gas outlet 127 and seal a first portion 143 of the scroll passage 125 near a beginning of the scroll passage from a second portion 145 of the scroll passage near the end of the scroll passage. One or more structures or means is provided for moving the nozzle ring 135 relative to the scroll passage 125 to establish the bypass flow between the first and second portions 143 and 145 of the scroll passage. As seen in FIG. 2C, this opens a bypass or passage 147 between a first and second portions 143 and 145 of the scroll passage 125. The ordinary flow pattern through the scroll passage 125, the nozzle ring 135, and the gas outlet 127 for the turbine 123 when the nozzle ring is not moved to open the bypass 147 is substantially the same as the ordinary flow pattern for the turbine 23 seen in FIG. 2A. This flow, usually a flow with minimal turbulence, through the scroll passage 125, the nozzle ring 135, and against the turbine blades 131 is disrupted by the opening of the bypass 147 as higher pressure flow from the first portion 143 of the scroll passage flows into the lower pressure region at the second portion 145 of the scroll passage. Consequently, turbine efficiency decreases. The nozzle ring 135 can be moved in any suitable manner, such as by providing an outer geared surface 149 (shown in phantom) on or connected to the nozzle ring that meshes with a driven gear 151 (shown in phantom in FIG. 2C) that is disposed in the turbine housing or at least partially extends through a wall of the turbine housing and is driven through a limited angle by a motor 153 (shown in phantom), or other suitable means, that may be disposed outside, inside, or partially inside and partially outside the turbine housing. An external linear actuator that can reciprocate a shaft or linkage component that extends through an opening in the turbine housing and move a linkage that converts linear motion of the shaft into rotational motion of the ring (or of a vane) is presently believed to be particularly useful because only a single seal where they shaft or linkage extends through the turbine housing is needed. It may also be possible to move the ring (or vane) by means that do not require a mechanical connection extending through the turbine housing, such as by providing permanent magnets on the ring and moving the ring via a magnetic field around the turbine housing.

If the entire nozzle ring 135 is moved as seen in FIG. 2C, the plurality of vanes 137 and 139 on the nozzle ring 135 are also moved. If the vanes 137 and 139 are oriented to achieve maximum turbine efficiency when oriented as shown in FIG. 2A, turbine efficiency can be decreased by turning the nozzle ring 135 relative to the scroll passage 125 through a small angle. Ordinarily, the nozzle ring 135 rotates about an axis of the turbine wheel 129 through an arc of no more than an arc between outermost peripheral tips of any two adjacent vanes 137 and 139 on the nozzle ring. For example, if the nozzle ring 135 has 18 vanes 137 and 139 spaced every 20° around the circular nozzle ring, the nozzle ring might be moved as much as 20° but, more typically will be moved through an angle less than 200, such as an angle between 1° and 19°, more typically between 5° and 15°, and still more typically, about 10°. By such an angular movement, gas that had been deflected by the vanes 137 and 139 toward the one or more blades 131 of the turbine wheel 129 at one angle as seen in FIG. 2A (illustrated by arrows extending across the nozzle ring 35) will be deflected in a somewhat different manner (illustrated by arrows extending across the nozzle ring 135 in FIG. 2C). While not wishing to be bound by theory, the movement of the nozzle ring 135 from a position in which the turbine is at maximum efficiency through a limited angle to a second position can generate more turbulence in the turbine 123 and decrease its efficiency. Altering gas flow from the scroll passage 125 through the vanes 137 and 139 into the gas outlet 127 can result in lower turbine efficiency, as can introduction of the gas into the gas outlet 127 against the turbine blades 131 at a sub-optimal angle.

Figure 3A:
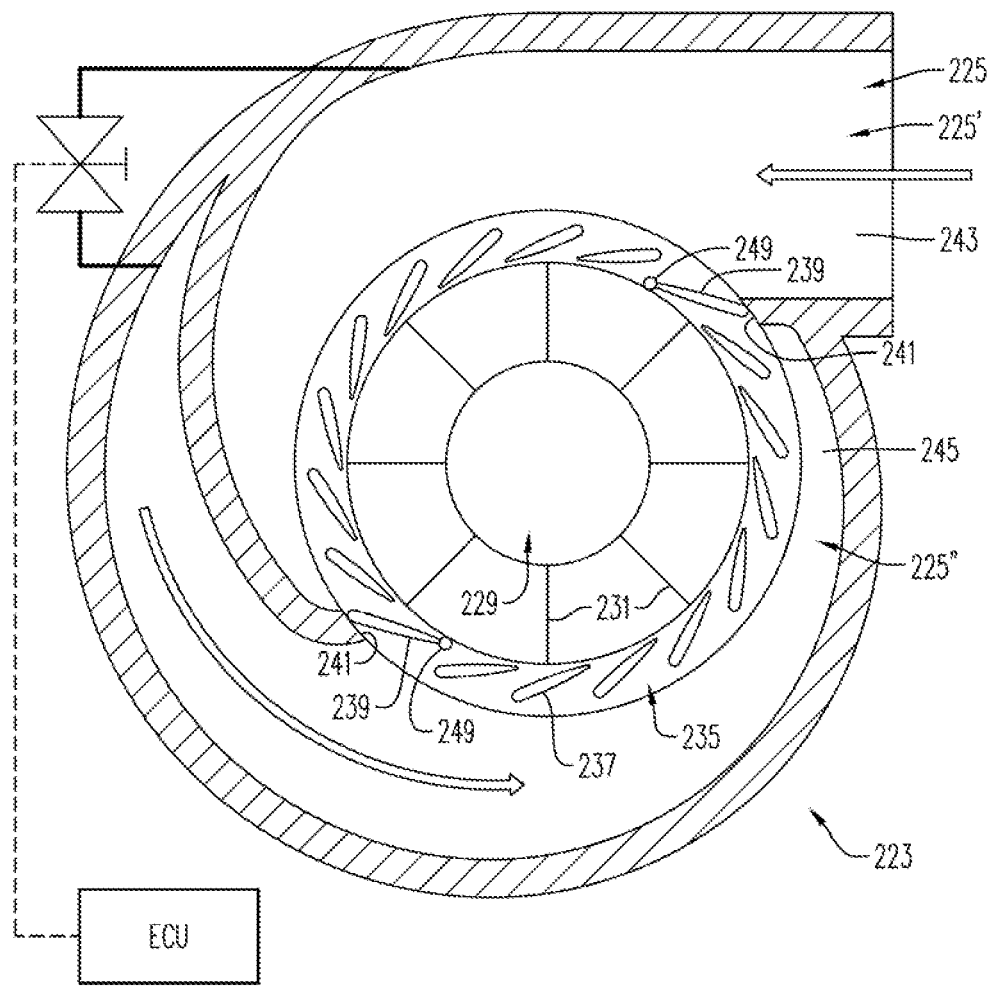
FIG. 3A is a partially cross-sectional view of a portion of a turbine according to an aspect of the present invention.

FIG. 3A shows an embodiment of a turbine 223 that can be used in the turbocharger 21 shown in FIG. 1 instead of the turbine 23. The turbine 223 comprises a twin scroll passage 225 comprising a first scroll passage 225' and a second scroll passage 225" that, respectively, correspond to first and second portions 243 and 245 of the scroll passage. The turbine 223 comprises a gas outlet 227 extending axially from the first and second scroll passages 225' and 225" and a turbine wheel 229 comprising one or more blades 231 disposed in the gas outlet.

As with the turbine 23 with the single scroll passage shown in FIGS. 2A-2C, one or more of several suitable structures or means can be provided for establishing a bypass flow between the first and second portions of the scroll passages 225' and 225" such that some or all of the gas flowing through the scroll passages toward the gas outlet 223 is permitted to flow to one or the other of the first and second portions before it reaches the gas outlet. The structure for establishing the bypass flow can alter or disrupt gas flow and/or lower pressure of the gas in the scroll passage when the bypass flow is established, so as to tend to reduce turbine efficiency. Reduced turbine efficiency can, in turn, result in increased temperature of gas exiting the engine 33 to which the turbocharger 21 is attached. The increased engine exhaust temperature can be used to activate catalysts in exhaust aftertreatment system equipment such as a diesel particulate filter (DPF), a diesel oxidation catalyst (DOC), and/or a selective catalytic reduction catalyst (SCR). It can also facilitate regeneration of the DPF by creating or helping to create sufficiently high temperatures for O2 based regeneration or for NO2 based regeneration.

Figure 3B:
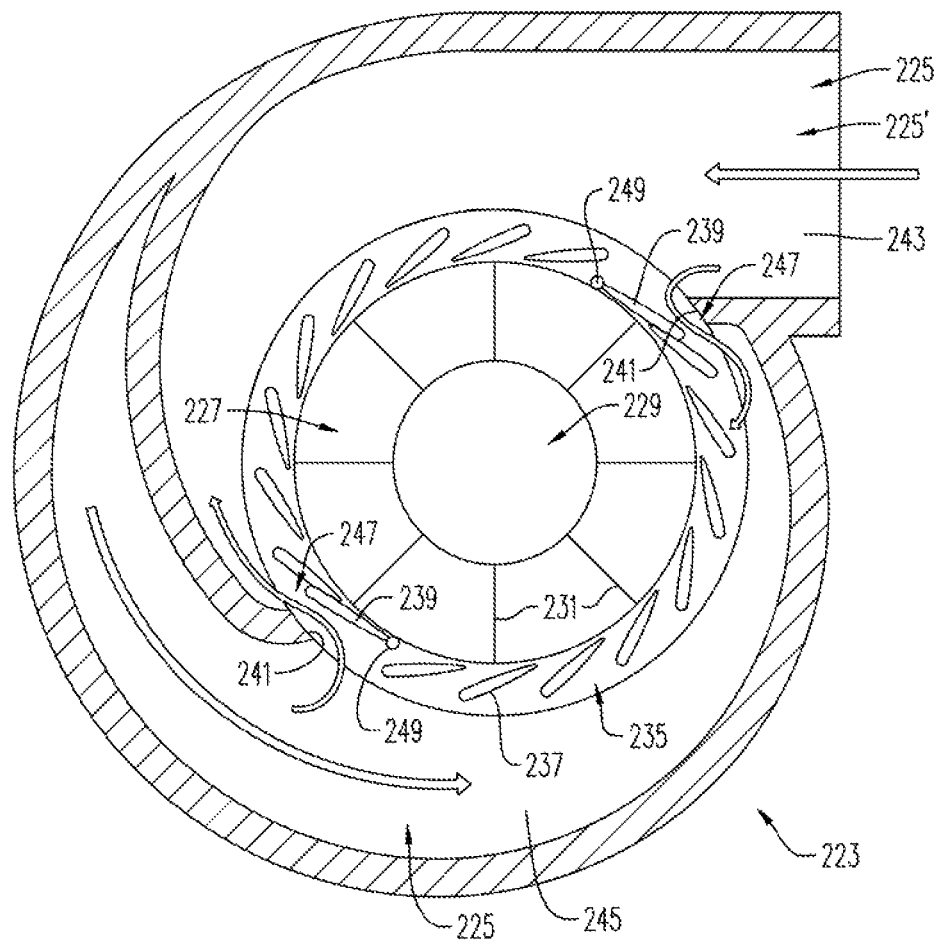
FIG. 3B is a partially cross-sectional view of the portion of the turbine of FIG. 3A showing a sealing vane moved relative to a nozzle ring of the turbine.

FIG. 3A shows one possible structure for establishing the bypass flow that can be used by itself or in conjunction with the structures shown in FIGS. 3B and/or 3C. Specifically, a conduit 255 can be connected between a first portion 243 of the scroll passage 225 formed by the first scroll passage 225' from a second portion 245 of the scroll passage formed by the second scroll passage 225" and a controllable valve 257 can be provided in the conduit that opens to establish the bypass flow. The valve 257 can be controlled by a conventional ECU or other computing device 259, or by any other suitable means, including manual operation.

One of the possible structures for establishing the bypass flow is seen in FIG. 3B and comprises a nozzle ring 235 arranged between the scroll passage 225 (i.e., the first and second scroll passages 225' and 225") and the gas outlet 227. The nozzle ring 235 comprises a plurality of vanes 237 adapted to direct a flow of gas from the scroll passage 225 against the one or more blades 231 of the turbine wheel 229 in the gas outlet 227. The nozzle ring 235 shown in FIGS. 3A and 3B comprises at least two sealing vanes 239 that extend to inner wall portions or tongues 241 of the gas outlet 227 that separate the portion of the first scroll passage 225' that meets the gas outlet from the portion of second scroll passage 225" and seals the first portion 243 of the scroll passage 225, i.e., the first scroll passage 225', from the second portion 245 of the scroll passage, i.e., the second scroll passage 225". In the embodiments shown in FIGS. 3A-3C, the first and second portions 243 and 245 of the scroll passage 225 take the form of different scroll passages. One or more structures or means is provided for moving the sealing vanes 239 relative to the scroll passage 225 to establish the bypass flow between the first and second portions 243 and 245 of the scroll passage. The sealing vanes 239 are moved relative to the scroll passage 225 by moving the sealing vane relative to a stationary nozzle ring 235. As seen in FIG. 3B, this opens bypasses or passages 247 between a first and second portions 243 and 245 of the scroll passage 225. The ordinary flow pattern seen in FIG. 3A, usually a flow with minimal turbulence, through the scroll passage 225, the nozzle ring 235, and against the turbine blades 231 is disrupted by the opening of the bypasses 247 as higher pressure flow from the first portion 243 of the scroll passage flows into the lower pressure region at the second portion 245 of the scroll passage, or higher pressure flow from the second portion flows into the lower pressure region in the first portion, depending upon which portion has, at the particular time, higher or lower pressure. Consequently, turbine efficiency decreases.

The sealing vanes 239 can be moved in any suitable manner, such as by being mounted on a pivotable rod 249 mounted in a wall of the turbine housing and can be turned through a limited angle by a device such as a solenoid, motor, or other suitable means (motor 51 shown schematically in FIG. 1). Ordinarily, the rod 249 will extend through a wall of the turbine housing and the rod and sealing vane 239 will be turned by a device 251 mounted outside of the turbine, although numerous arrangements can be contemplated for driving the rod and sealing vane, and including devices that would be disposed inside the turbine housing, not necessarily from outside of the turbine.

Figure 3C:
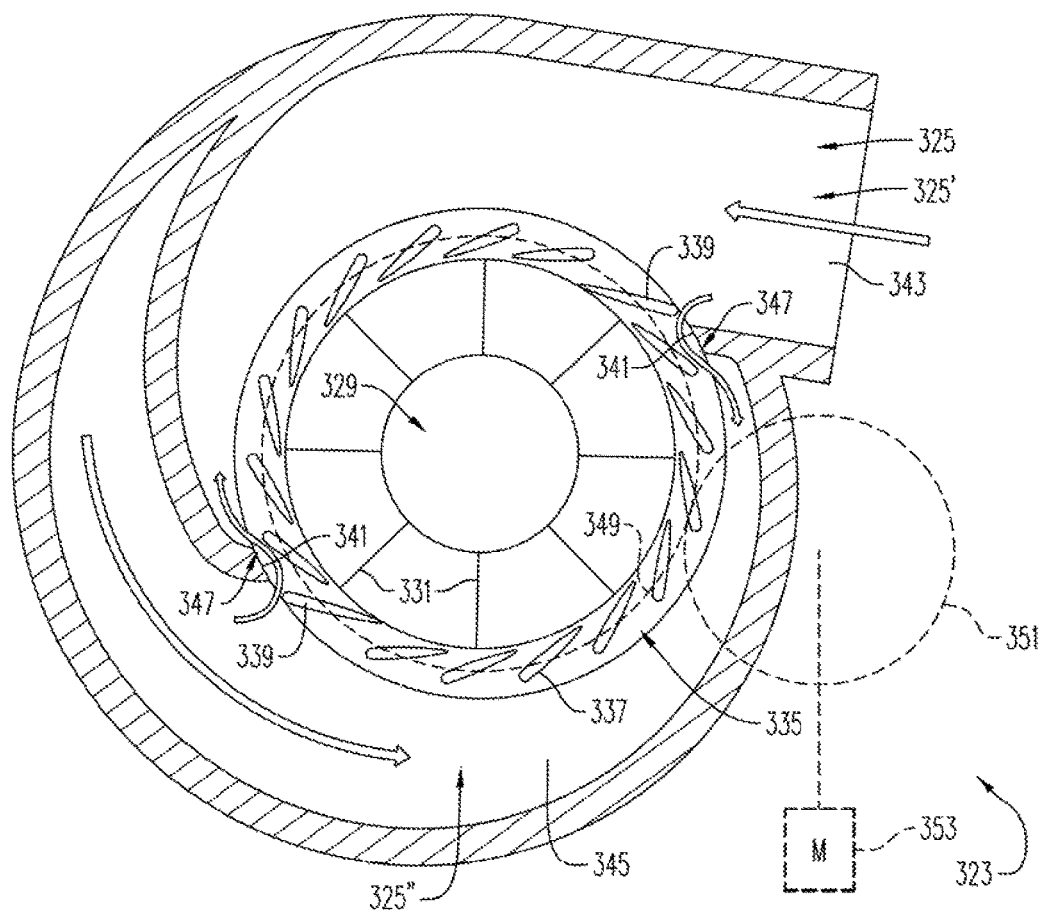
FIG. 3C is a partially cross-sectional view of a portion of a turbine according to another aspect of the present invention showing a nozzle ring moved relative to a scroll passage

Another one of the possible structures for establishing the bypass flow is seen in FIG. 3C and comprises a nozzle ring 335 arranged between the scroll passage 325 and the gas outlet 327. The scroll passage 325 comprises a first scroll passage 325' and a second scroll passage 325" that, respectively, correspond to first and second portions 343 and 345 of the scroll passage. The nozzle ring 335 comprises a plurality of vanes 337 adapted to direct a flow of gas from the scroll passage 325 against the one or more blades 331 of the turbine wheel 329 in the gas outlet 327. The nozzle ring 335 shown in FIG. 3C, like the nozzle ring 235 shown in FIGS. 3A-3B, comprises at least two sealing vanes 339 that extend to inner wall portions or tongues 341 of the gas outlet 327 and seal the first portion 343 of the scroll passage 325, i.e., the first scroll passage 325', from a second portion 345 of the scroll passage, i.e., the second scroll passage 325". One or more structures or means is provided for moving the nozzle ring 335 relative to the scroll passage 325 to establish the bypass flow between the first and second portions 343 and 345 of the scroll passage. As seen in FIG. 3C, this opens a bypass or passage 347 between a first and second portions 343 and 345 of the scroll passage 125. The ordinary flow pattern through the scroll passage 325, the nozzle ring 335, and the gas outlet 327 for the turbine 323 when the nozzle ring is not moved to open the bypass 347 is substantially the same as the ordinary flow pattern for the turbine 223 seen in FIG. 3A. This flow, usually a flow with minimal turbulence, through the scroll passage 325, the nozzle ring 335, and against the turbine blades 331 is disrupted by the opening of the bypass 347 as higher pressure flow from the first portion 343 of the scroll passage flows into the lower pressure region at the second portion 345 of the scroll passage, or higher pressure flow from the second portion flows into the lower pressure region in the first portion, depending upon which portion has, at the particular time, higher or lower pressure. Consequently, turbine efficiency decreases. The nozzle ring 335 can be moved in any suitable manner, such as by providing an outer geared surface 349 (shown in phantom) on or connected to the nozzle ring that meshes with a driven gear 351 (shown in phantom) that is disposed in the turbine housing or at least partially extends through a wall of the turbine housing and is driven through a limited angle by a motor 353 (shown in phantom), or other suitable means, that may be disposed outside, inside, or partially inside and partially outside the turbine housing.

If the entire nozzle ring 335 is moved as seen in FIG. 3C, the plurality of vanes 337 and 339 on the nozzle ring 335 are also moved. If the vanes 337 and 339 are oriented to achieve maximum turbine efficiency when oriented as shown in FIG. 3A, turbine efficiency can be decreased by turning the nozzle ring 335 relative to the scroll passage 325 through a small angle. Ordinarily, the nozzle ring 335 rotates about an axis of the turbine wheel 329 through an arc of no more than an arc between outermost peripheral tips of any two adjacent vanes 337 and 339 on the nozzle ring. For example, if the nozzle ring 335 has 18 vanes 337 and 339 spaced every 20° around the circular nozzle ring, the nozzle ring might be moved as much as 20° but, more typically will be moved through an angle less than 20°, such as an angle between 1° and 19°, more typically between 5° and 15°, and still more typically, about 10°. By such an angular movement, gas that had been deflected by the vanes 337 and 339 toward the one or more blades 331 of the turbine wheel 329 at one angle as seen in FIG. 3A will be deflected in a somewhat different manner. While not wishing to be bound by theory, the movement of the nozzle ring 335 from a position in which the turbine is at maximum efficiency through a limited angle to a second position can generate more turbulence in the turbine 323 and decrease its efficiency. Altering gas flow from the scroll passage 325 through the vanes 337 and 339 into the gas outlet 327 can result in lower turbine efficiency, as can introduction of the gas into the gas outlet 327 against the turbine blades 331 at a sub-optimal angle.

A method according to an aspect of the present invention for adjusting exhaust gas temperature in an engine comprising a turbine arranged to receive engine exhaust is described with reference to the engine 33 shown in FIG. 1. For purposes of illustration, the method shall be described in connection with a single scroll turbine 23 as shown in FIGS. 2A-2B, except where otherwise noted. It will be appreciated that the description of the method in connection with the single scroll turbine 23 is also generally applicable to the single scroll turbine 123 shown in FIG. 2C and the twin scroll turbines 223 and 323 shown in FIGS. 3A-3C, except where otherwise noted.

In the method, engine exhaust gas is caused to flow from the engine 33 (FIG. 1) through a scroll passage 25 of the turbine 23 toward a gas outlet 27 of the turbine. The scroll passage 25 comprises at least first and second portions 43 and 45. A bypass flow of the exhaust gas is caused to flow through a bypass 47 between the first and second portions 43 and 45 of the scroll passage 25. By establishing the bypass 47 and bypass flow, efficiency of the turbine 23 will ordinarily be decreased relative to the condition when there is no bypass, and exhaust temperature will ordinarily rise.

In the embodiment of FIGS. 2A-2B, as in the embodiment of FIG. 2C, the first portion 43 of the scroll passage 25 is near a beginning of the scroll passage and the second portion 45 is near an end of the scroll passage, and the first and second portions are separated by a tongue 41. In the embodiments of FIGS. 3A-3C, first and second portions of the scroll passage are first and second scroll passages of a twin scroll passage that are separated by two tongues.

Referring to the embodiment of FIGS. 2A-2B for purposes of illustration, the exhaust gas is directed by a nozzle ring comprising a plurality of vanes 37 and 39 arranged at a first orientation relative to the scroll passage against one or more blades 31 of the turbine wheel 29 in the gas outlet 27 of the turbine. The nozzle ring 35 comprises at least one sealing vane 39 that, during ordinary operation, is arranged so that the first portion 43 of the scroll passage 25 is sealed from the second portion 45 of the scroll passage.

The bypass 47 for establishing the bypass flow between the first and second portions 43 and 45 of the scroll passage 25 is opened by moving the sealing vane 39 relative to the scroll passage 25. In the embodiment of FIGS. 2A-2B (and in the embodiment of FIGS. 3A-3B), the sealing vane 39 is moved relative to the scroll passage 25 by moving the sealing vane relative to the nozzle ring 35.

In the embodiment of FIG. 2C (and in the embodiment of FIG. 3C), the sealing vane 139 is moved relative to the scroll passage 125 by moving the nozzle ring 135 relative to the scroll passage. Moving the nozzle ring 135 from a first position, e.g., a position like the position shown in FIG. 2A (or 3A) to a second position, e.g., a position like the position shown in FIG. 2C (or 3C) relative to the scroll passage 125 alters flow of exhaust gas from the scroll passage to the gas outlet through the plurality of vanes 137 and 139. Altering gas flow in the turbine from a gas flow (illustrated by arrows extending across the nozzle ring 35) as shown in FIG. 2A, which shall be assume to achieve optimal turbine efficiency, to a gas flow (illustrated by arrows extending across the nozzle ring 135) as shown in FIG. 2C can also reduce turbine efficiency and, thus, increase exhaust temperature.

In any of the illustrated embodiments, a bypass flow can be achieved by establishing a bypass via a conduit 55 connected to the first and second portions 43 and 45 of the scroll passage, such as by opening a valve 57 in the conduit. In addition, the embodiment of FIGS. 2A-2B including a nozzle ring 35 with a movable sealing vane 39 can be combined with the embodiment of FIG. 2C including a movable nozzle ring 135. In addition, the embodiment of FIGS. 3A-3B including a nozzle ring 235 with movable sealing vanes 239 can be combined with the embodiment of FIG. 3C including a movable nozzle ring 335.

Provision of a movable nozzle ring or nozzle ring vane can allow control of turbo wheel speed (TWS) and exhaust backpressure, as done in engines using a variable geometry turbocharger or exhaust throttle device. This can facilitate engine braking and EGR flow control (via restriction/backpressure).

Additionally, current engine designs are limited in turbine design by various mechanical and physical constraints. With a turbine that is designed to run at a high speed (130,000 rpm, for example), the turbine must be designed to be mechanically sound at this speed and aerodynamically capable, i.e., not hitting choked flow or surge, etc. If peak speed can be limited with a technology (to, say, 110,000 rpm), the turbine can be redesigned to new constraints, and turbine efficiency can be improved. So, controlling speed allows for a more optimal design overall.

Aspects of the present invention permit providing substantially all of the advantages of a VGT in any turbine, not just a turbine that is part of a mechanically coupled turbocharger unit.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A turbocharger, comprising:
a turbine comprising
a scroll passage comprising at least first and second portions,
a gas outlet extending axially from the scroll passage,
a turbine wheel comprising one or more blades disposed in the gas outlet, and means for establishing a bypass flow between the first and second portions of the scroll passage,
wherein the means for establishing the bypass flow comprises a nozzle ring arranged between the scroll passage and the gas outlet, the nozzle ring comprising a plurality of vanes fixed relative to tire nozzle ring and adapted to direct a flow of gas from the scroll passage against the one or more blades of the turbine wheel in the gas outlet, the first and second portions of the scroll passage being disposed radially outward of the nozzle ring, the nozzle ring comprising at least one sealing vane that seals the first portion of the scroll passage from the second portion of the scroll passage, and means for moving the sealing vane relative to the scroll passage to establish a bypass flow between the first and second portions of the scroll passage.

2. The turbocharger as set forth in claim 1, wherein the means for moving the sealing vane moves the sealing vane relative to the nozzle ring.

3. The turbocharger as set forth in claim 1, wherein the means for moving the sealing vane comprises means for moving the nozzle ring relative to the scroll passage.

4. The turbocharger as set forth in claim 3, wherein the means for moving the nozzle ring rotates the nozzle ring about an axis of the turbine wheel through an arc of no more than an arc between outermost peripheral tips of any two adjacent vanes on the nozzle ring.

5. The turbocharger as set forth in claim 1, wherein the means for establishing the bypass flow further comprises a conduit connected between the first and second portions of the scroll passage and a controllable valve in the conduit that opens to establish the bypass flow.

6. The turbocharger as set forth in claim 1, wherein the first and second portions of the scroll passage comprise an inlet region and an end region of the scroll passage.

7. The turbocharger as set forth in claim 1, wherein the scroll passage is a twin scroll passage and the first and second portions of the scroll passage comprise first and second scroll passages.

8. A method for adjusting exhaust gas temperature in an engine comprising a turbine arranged to receive engine exhaust, comprising:
causing engine exhaust gas to flow through a scroll passage of the turbine toward a gas outlet of the turbine, the scroll passage comprising at least first and second portions;
directing the exhaust gas against one or more blades of the turbine wheel in the gas outlet, of the turbine with a nozzle ring comprising a plurality of vanes arranged at a first orientation relative to the scroll passage and fixed relative to the nozzle ring, and
establishing the bypass How between the first and second portions of the scroll passage, wherein the nozzle ring comprises at least one sealing vane arranged so that the first portion of the scroll I passage is sealed from the second portion of the scroll passage, the bypass flow being established between the first and second portions of the scroll passage by moving the sealing vane relative to the scroll passage, the first and second portions of the scroll passage being disposed radially outward of the nozzle ring.

9. The method as set forth in claim 8, comprising moving the sealing vane relative to the scroll passage by moving the sealing vane relative to the nozzle ring.

10. The method as set forth in claim 8, comprising moving the sealing vane relative to the scroll passage by moving, the nozzle ring relative to the scroll passage.

11. The method as set forth in claim 10, comprising altering gas how from the scroll passage through the plurality of vanes and into the gas outlet by moving the nozzle ring from a first position relative to the scroll passage to a different second position relative to the scroll passage.

12. The method set forth in claim 8, further comprising establishing the bypass flow by opening a valve in a conduit connected between the first and second portions of the scroll passage.

13. The method as set forth in claim 8, wherein the first and second portions of the scroll passage comprise an inlet region and an end region of the scroll passage.

14. The method as set forth in claim 8, wherein the scroll, passage is a twin scroll passage and the first and second portions of the scroll passage comprise first and second scroll passages.

* * * * *